US006258445B1

(12) United States Patent
Schilling et al.

(10) Patent No.: US 6,258,445 B1
(45) Date of Patent: Jul. 10, 2001

(54) SCREEN PRINTING FORM AND FLEXIBLE SCREEN PRINTING FORM ACCOMMODATING DEVICE

(75) Inventors: Christian Schilling, Seuzach; Horst Baumann, Thal; Martin Lehner, Engelburg, all of (CH)

(73) Assignee: Sefar AG, Thal (CH)

( * ) Notice: Subject to any disclaimer, the term of this patent is extended or adjusted under 35 U.S.C. 154(b) by 0 days.

(21) Appl. No.: 09/254,820

(22) PCT Filed: Sep. 10, 1997

(86) PCT No.: PCT/EP97/04953

§ 371 Date: Mar. 12, 1999

§ 102(e) Date: Mar. 12, 1999

(87) PCT Pub. No.: WO98/10941

PCT Pub. Date: Mar. 19, 1998

(30) Foreign Application Priority Data

Sep. 13, 1996 (DE) .............................................. 196 37 272

(51) Int. Cl.[7] ............................. B32B 23/02; B32B 15/01

(52) U.S. Cl. .................................. 428/193; 442/6; 442/7; 442/15; 442/16; 442/52; 428/216

(58) Field of Search .............................. 442/6, 7, 15, 16, 442/52; 428/193, 216

(56) References Cited

U.S. PATENT DOCUMENTS

| | | |
|---|---|---|
| 5,111,743 | 5/1992 | Umaba et al. . |

FOREIGN PATENT DOCUMENTS

| | | |
|---|---|---|
| 953973 | 3/1974 | (CA) . |
| 2936135 | 3/1981 | (DE) . |
| 60-262689 | 12/1985 | (JP) . |
| 9200495 | 3/1992 | (NL) . |
| 9517534 | 6/1995 | (WO) . |

*Primary Examiner*—Elizabeth M. Cole
*Assistant Examiner*—Ula Ruddock
(74) *Attorney, Agent, or Firm*—Bachman & LaPointe, P.C.

(57) ABSTRACT

The invention relates to a screen printing fabric made of self crossing plastic threads with an emulsion coating, wherein the plastic threads are coated with a vacuum metallized or sputtered encasing layer which is covered by an emulsion bearing metal coating produced by electroplating.

11 Claims, 4 Drawing Sheets

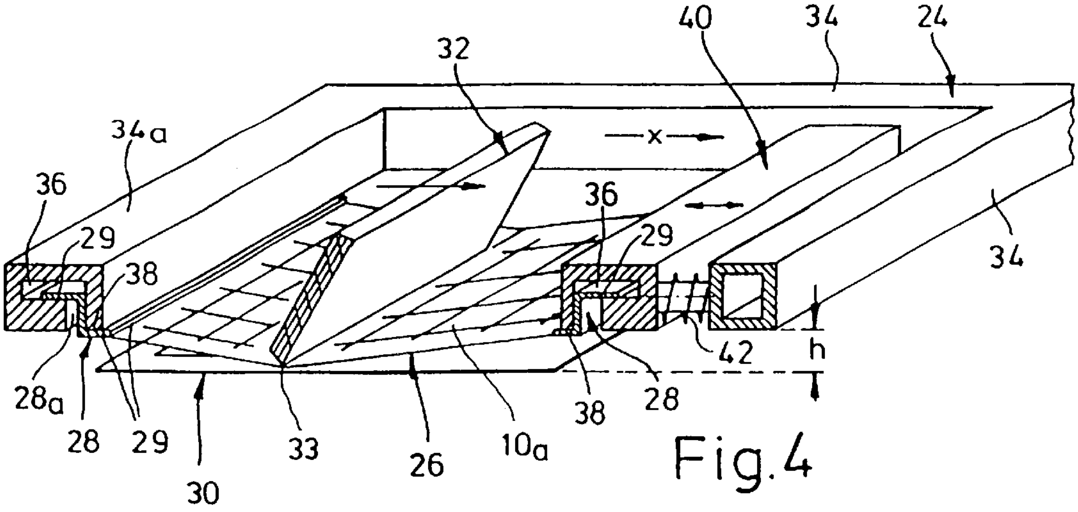
Fig.4
Fig.5
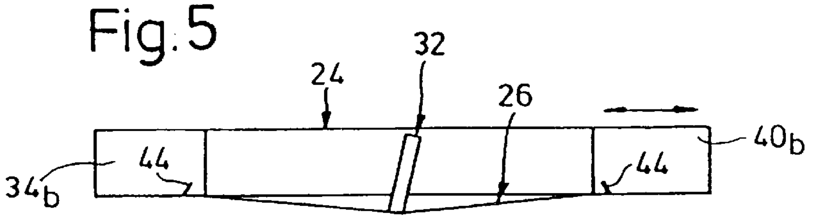
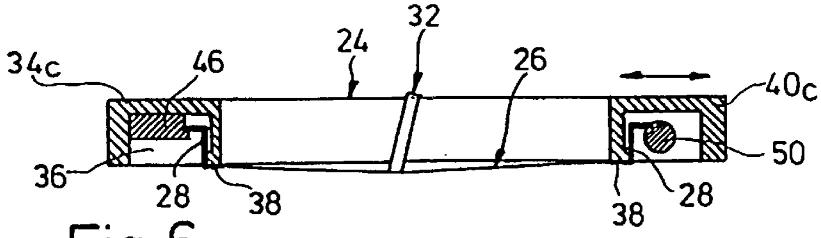
Fig.6
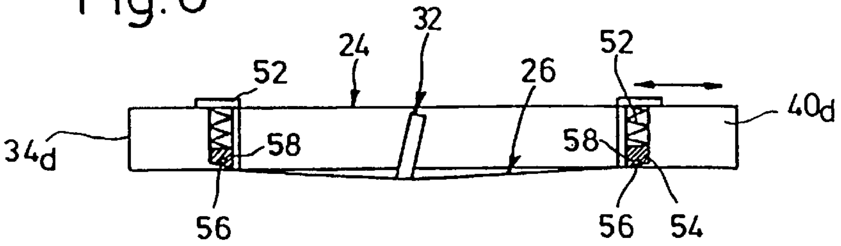
Fig.7

SCREEN PRINTING FORM AND FLEXIBLE SCREEN PRINTING FORM ACCOMMODATING DEVICE

The invention concerns a printing apparatus with a flexible screen printing form comprising plastic cloth in a printing frame as set forth in the classifying portion of claim 1. The invention also concerns a screen printing form with screen printing cloth comprising mutually crossing plastic yarns as a carrier for a coating comprising an—in particular photosensitive—emulsion, as set forth in the classifying portion of claim 1.

U.S. Pat. No. 5,111,743 describes a printing apparatus with a flexible screen printing plate comprising a textile-like cloth which is made from silk, nylon, polyester or the like yarns or however from stainless steel wires. Metal plates with a hole system etched therein are also mentioned. That screen printing plate is clamped at two parallel edge regions into a printing frame, between which a rubber scrubber can be reciprocated for applying ink.

The one edge of the plate is fixed with screws which engage through one side of the frame, while the opposite edge of the plate can be displaced by means of a frame member which is fixed thereto and which is mounted with play in the printing frame; for that purpose, provided on the displaceable frame member is a central bar which with its outwardly facing free end engages through the adjacent side of the frame, against the outside surface of which it bears by means of coil spring.

Centuries after it was first used in China the screen printing process has been known in Europe approximately since the 19th Century; a fine-mesh textile cloth or wire mesh material is stretched out in a screen printing frame and covered at the image-free regions so as to be impermeable to ink. Besides manual cut stencils—for example for labelling or writing—nowadays preferably photographically produced direct or indirect stencils are the usual practice; the choice of the kind of stencil adopted—in the case of direct stencils those with emulsion, with direct film and emulsion or with direct film and water—is left to the discretion of the screen printer.

A plurality of steps are usually required to produce a screen printing form. Firstly a screen printing cloth is stretched out over a clamping frame of light metal or alloy, wood or the like, and is glued to the frame in its stretched position. Cleaning of the cloth permits the subsequent application of a photosensitive emulsion, for example using a coating channel manually or by machine with an automatic coating apparatus. As the coating thereon cannot be produced exactly as far as the inward side of the frame, the remaining surface area must be subsequently sealed off using screen filler. The coated surface is now exposed by means of a copy original (film) corresponding to the print image. The regions of the print image which are not exposed are washed out.

After the washing-out operation, what is produced is the actual screen printing stencil, the edge zones of which often still have to be covered over. When those covering portions are also dried, printing can be effected with the stencil. In addition the individual items of equipment which are used for the respective stencil production steps have to be cleaned. Thus the amount of work involved in the production of a screen printing stencil and in particular an individual stencil is relatively great.

For certain areas of use, it is known, when dealing with plastic meshes, to settle palladium nuclei or seeds on the surface by a chemical treatment of the surface, and to metallise the filaments. Those chemical treatment procedures involve a plurality of stages and are to be matched in terms of their compositions and operating procedures to the respective plastic material involved. Limitations in regard to the choice of material are predetermined on the basis of poor or unsuitable materials. The known expensive preliminary treatments can be followed by expensive chemical metal deposition processes; because of its inadequate conductivity, the pre-treated plastic cloth surface cannot be directly covered with a galvanic metal deposit.

A further aspect is that the stencil carriers which are used nowadays in screen printing, prior to mounting of the actual stencil, have to be braced and glued on a frame on all sides. In that respect the quality of the printing is dependent on the correct cloth tension, relaxation of the cloth, the adjusted deflection effect, the squeegee pressure or the like factors. So that the adjusted deflection effect as between the cloth and the object being printed upon can be overcome, stretching of the stencil is necessary. In the case of stencil carriers without natural stretch or with only a very low degree of natural stretch, that results in high alternating tensile loadings which can result in the stencil carriers suffering from rapid fatigue effects or possibly can result in destruction thereof.

As printing can satisfactorily occur with those low-stretch stencil carriers in a flat screen printing process, a printing or clamping frame is necessary which is capable of compensating for the variations in length caused by the deflection effect.

U.S. Pat. No. 3,303,777 describes a holding arrangement for a stencil on a screen printing machine, in which it is to be fixed and tensioned at two parallel regions—which cross the direction of movement of a displaceable squeegee which presses the printing inks through screen meshes.

In consideration of those factors the inventor set himself the aim of considerably simplifying manufacture and handling of screen printing forms or stencils, making the use thereof in printing mechanisms more operator-friendly and increasing their register accuracy—even with high numbers of print runs. In addition the inventions seeks to provide that the print quality is optimised in the case of fine lines and patterns by homogenous coating, with a constant structure.

In regard to the printing or clamping frame, the invention seeks to make it possible to use stencil carriers without natural stretch while seeking to eliminate the changes in length caused by the above-mentioned deflection effect—and therewith changes in tension of the stencil. Minimum stencil tightening tensions are intended to permit minimum squeegee pressures, which results in a reduced amount of wear of the stencil and the squeegee. Tightening the screen printing stencil in only one direction permits a constant specific squeegee pressure over the printing width.

In accordance with the invention the plastic threads or yarns are coated with a casing layer which is produced thereon by vapour deposition and which in turn is covered over by a metal coating which carries the emulsion and which is produced by galvanisation. In accordance with another feature of the invention the plastic cloth can also be prepared for the galvanisation operation by so-called sputtering or cathode sputtering with the casing layer.

As misprinting can definitely occur with those low-stretch stencil carriers in a flat screen printing process, a printing or clamping frame is necessary which is capable of compensating for the variations in length caused by the deflection effect.

U.S. Pat. No. 3,303,777 describes a holding arrangement for a stencil on a screen printing machine, in which it is to be fixed and tensioned at two parallel regions—which cross the direction of movement of a displaceable squeegee which presses the printing inks through screen meshes.

U.S. Pat. No. 1,934,643 dating from the year 1930 describes a cloth of electrically conductive material, the surface of which is provided with a non-metallic cover layer or a cover layer of pure metal or an alloy, in particular with nickel or chromium, by spraying, plating or a chemical or galvanic process.

U.S. Pat. No. 4,042,466 discloses a process for the production of a cloth web which is made from a textile cloth for use as a screen printing stencil, the web being provided with a metallic cover layer. For that purpose the plastic yarns are coated with a thin metal layer of for example copper of a thickness of 1 to 2 $\mu$m as a conductive intermediate layer and a nickel layer of 25 $\mu$m is applied thereto by galvanisation.

In consideration of those factors the inventor set himself the aim of considerably simplifying the use of screen printing forms or stencils in printing machines and making them more operator-friendly and increasing their register accuracy, even with high numbers of print runs. In addition the inventions seeks to provide that the print quality is optimised in the case of fine lines and patterns by homogenous coating, with a constant structure.

In regard to the printing or clamping frame, the invention seeks to make it possible to use stencil carriers without natural stretch while seeking to eliminate the changes in length caused by the above-mentioned deflection effect—and therewith changes in tension of the stencil. Minimum stencil tightening tensions are intended to permit minimum squeegee pressures, which results in a reduced amount of wear of the stencil and the squeegee. Tightening the screen printing stencil in only one direction permits a constant specific squeegee pressure over the printing width.

In accordance with the invention the screen printing form of the printing apparatus comprises a metallised plastic cloth which is provided with a metallic casing layer carrying the emulsion and the casing layer is in turn covered with a metal coating, wherein the plastic cloth is provided from both sides thereof with the metallic casing layer and then galvanically coated; the connecting devices are profiled connecting bars of which one is connected to the movable element which is in the form of a tensioning bar.

Therefore the screen printing plate is fixed—with the interposition of connecting bars arranged at two parallel plate edges—on the one hand to one side of the printing or clamping frame and on the other hand to a tensioning bar which is displaceable in the frame parallel to the first-mentioned side thereof. The tensioning bar is disposed transversely to the direction of movement of a squeegee which presses the printing inks through the stencil. That form of fixing in two regions which cross the squeegee direction and unsecured longitudinal edges—eliminates sag such as to distort the printing result, in the form of a catenary curve which is produced in terms of cross-section between the longitudinal edges.

By virtue of the particular configuration of two edge zones of the screen printing plate, it can be very easily fitted into a printing or clamping frame on the printing mechanism and tensioned. For that purpose specific connecting or attachment profile members are to be disposed at the ends of the plate. However, the provision of a perforation arrangement for engaging the ends of the plates in position is also within the scope of the invention.

In order to facilitate handling in particular when dealing with large stencil formats, it is also possible to use bars in the attachment region or a closed thin-wall frame of metal sheet or like material, of the same size as the screen printing plate.

The metallisation of the cloth, in accordance with the invention, affords an adequate level of angular strength with the result that the screen printing plate only has to be tensioned in one direction and in that case nonetheless there are no register differences transversely with respect to the tensioning direction. In addition that tensioning effect at one side means that the print image can be taken laterally as far as the edge of the screen printing plate; it is only necessary to leave space for mounting an ink delimitation means which can be glued in position, welded, sewn or fixed in some other manner.

It has been found desirable for the tensioning bar which tensions the screen printing plate to be connected by means of force storage means within the printing or clamping frame to one side thereof or to a frame member.

In order to adjust the tensioning position of the tensioning bar or the tensioning and printing position of the screen printing plate, it is possible in accordance with the invention to use mechanical, pneumatic, hydraulic or other means.

To facilitate the printing operation the screen printing plate should be stretched out at a spacing relative to a surface to be printed upon.

Various forms of the so-called connecting or attachment bars are of significance in terms of the invention. Thus, there is provided a connecting bar which is of a substantially S-shaped angled configuration in cross-section and whose support limb, in the tensioning position, lies on the one hand against a lower edge of the side of the frame—or the tensioning bar—and on the other hand against a shoulder in the interior, of undercut configuration, of the hollow side of the frame—or the hollow tensioning bar.

In the case of another connecting bar of approximately S-shaped angular configuration, the support limb thereof lies in the clamping position against a support surface of a tensioning shaft extending in the interior of the hollow side of the frame or the hollow tensioning bar.

The form of a further connecting bar is a hook bar which is inclined relative to the plane of the screen printing plate and which is adapted to be fitted into an inclined groove in the side of the frame or the tensioning bar. A further connecting bar is provided with a support limb which is bent out of the plane of the screen printing plate at an angle and which is adapted to be fitted into an equally inclined slot in the side of the frame or the tensioning bar.

Also in accordance with the invention is a screen printing form with screen printing cloth comprising mutually crossing plastic yarns as a carrier for a coating comprising an emulsion for a printing apparatus of the above-described kind, in which the plastic yarns are coated with a casing layer which is produced thereon by vapour deposition, flame-spraying or sputtering and which comprises at least one metal material and which in turn is covered by a metal coating which carries the emulsion and which is produced by galvanisation; the metal material is applied to the screen printing cloth on both sides thereof by spraying, vapour deposition or sputtering, possibly a plurality of times.

The plastic yarns are therefore coated with a vapour-deposited casing layer which in turn is covered by a casing coating which carries the emulsion and which is produced by galvanisation. In accordance with a further feature of the invention the plastic cloth can also be prepared for the galvanisation operation by so-called sputtering—by cathode atomisation—with the casing layer.

In both cases, the result obtained is a casing layer comprising metal material which preferably contains gold, silver, nickel, copper, steel and/or a light metal, in particular aluminium, alone or as an alloy.

In the above-mentioned vapour deposition or sputtering procedure, for the screen printing cloth according to the invention, layer thicknesses of about 5 to over 200 nanometers—in particular over 50 nm—are produced, which may have surface resistance values of below 0.2 ohm/2 to some hundred ohm/2, depending on the type of cloth and the kind of vapour deposition.

Electrical conductivity of the cloth is afforded by the dry process step of vapour deposition, cathode sputtering as mentioned above or vacuum plasma spraying.

The mechanical properties of the conductive cloth are primarily determined by its metallisation, for example by means of galvanic nickel-plating. Stretching is strikingly reduced, with an increased level of strength of the cloth, and—irrespective of the nature of the initial cloths—the resistance to slip of the cloth is increased to an extraordinary degree. The metallising substances contribute in particular to the strength at the bonding locations of the cloth of plastic base materials and form a conductive surface. It thus becomes possible to replace expensive metallic cloths by metallised plastic cloths with similar properties.

Therefore, the basis used for the screen printing plate which is produced in a finished condition and which is provided with a coating is a metallised plastic cloth, preferably with a metal coating of nickel because of its general strength. The metallic surface of the screen printing plate reduces the wear of the stencil, whereby it is possible to achieve very high numbers of print copies with the latter. The conductive surface of the screen printing plate prevents static charging phenomena. Limitations in regard to materials to be printed or inks, due to problems with static, can be practically eliminated.

The metallised plastic cloth according to the invention guarantees very minimal stretch phenomena with an adequate level of basic strength and provides that there are scarcely measurable register differences on the stencil, irrespective of the set clamping tension.

The fact that the limitedly flexible metallised cloth is coated over its full surface area by machine provides for a high, reproducible stencil quality with excellent edge sharpness and accurate ink metering. A protective foil (see 21*a* in FIG. 2) which is applied if necessary reduces improper manipulation operations which could cause impairment of the quality of coating. As the coating is effected on the endless roll of cloth, there is no need for covering operations, as are the conventional practice at the present time.

It has been found advantageous to cut screen printing plates of predetermined format sizes out of the metallised plastic cloth. They can be provided in particular at two oppositely disposed edges with connecting elements for fixing to a printing or clamping frame— preferred connecting elements are profiled connecting bars, between which the comparatively stiff screen printing plate extends.

The above-mentioned operation of cutting the screen printing plates to fixed format sizes—which if required can additionally be provided with register perforations—permits the end user to enjoy a standardised working procedure which begins directly with exposure of the screen printing plate, in accurate register relationship. After the procedure for washing out and drying the screen printing plate, it can be used for printing.

By virtue of this novel screen printing plate, restoration of an individual screen printing stencil which has failed during use thereof is also possible in a very short period of time.

In accordance with a further feature of the invention, the screen printing plate in a further configuration has at two parallel edges a respective strip bead which can be fitted into a mounting profile member as a connecting element.

By virtue of those features, the screen printing plate comprises a metallised plastic cloth which is coated by machine with a photosensitive substrate and which is possibly protected with a foil on the coating side. That means that all the preparation operations which are conventionally adopted nowadays in the production of a screen printing stencil are eliminated; the screen printing plate can be directly exposed and developed.

In addition the metallic surface of the stencil carrier guarantees substantial chemical resistance and a high level of mechanical abrasion resistance.

The coating operation by machine guarantees a uniformly high print quality with brilliant edge sharpness and precise metering of the medium to be used for printing.

The use of this screen printing plate considerably reduces the length of the stencil production procedure and eliminates possible sources of error in preparation for printing.

A fact that is to be considered as a further advantage is that the degree of utilisation of the screen printing plate—that is to say the ratio of the printable surface area to the total surface area—is far above that of a conventional cloth and is possibly doubled.

Due to the high inherent stability of the screen printing plate and its angular stiffness, tensioning of the printing plate during the printing process at only one side is also possible. In spite of tensioning exclusively in the squeegee direction, no noteworthy register differences transversely to the tensioning direction can be detected. With that tensioning effect in the squeegee direction, one plate fixing position is designed to be fixed (commencement of printing) and the other movable (end of printing). When the screen printing plate is clamped in position the biasing force of the spring or the pneumatic or hydraulic system takes effect. When the screen printing plate is pressed downwardly by virtue of the deflection effect by the squeegee, that change in length is compensated by virtue of the movable fixing of the screen printing plate. The tensioning force on it remains constant and independent of the selected deflection and it is not subjected to any fatigue loadings by virtue of the appropriate deflection being surpassed. As the screen printing plate is only tensioned at one side, there are also no additional loadings whatsoever by virtue of transverse stresses.

The squeegee pressure remains at a minimum as there are no deformation phenomena of the print carrier to be overcome. The squeegee loading over the printing width is constant as the known additional forces at the squeegee ends do not occur, due to the lack of transverse tensioning.

The following advantages for example are therefore enjoyed:

- the printing or clamping frame—by virtue of a single-sided movable stencil holding arrangement—permits the use of screen printing stencils with an extremely low degree of inherent stretch;
- the tensioning loadings on the screen printing stencil carrier can be kept low by means of printing or clamping frames, and that can be used for minimum squeegee pressure settings, and wear in respect of the printing plate and squeegee are thereby minimised;
- the printing or clamping frame permits printing with screen printing plates in accurate register relationship; the variations in length of the stencil by virtue of surpassing the stencil deflection and a variation in length of the stencil by virtue of unequal squeegee frictional forces are eliminated; and
- the lack of alternating loadings on the stencil carrier by virtue of the constant tightening tension in the clamping frame enhances the service life of the screen printing plate.

Further advantages, features and details of the invention will be apparent from the following description of preferred embodiments and with reference to the drawing in which:

FIG. 4 is a sectional perspective view of a screen printing frame with screen printing stencil and squeegee;

FIGS. 5 to 7 show views in longitudinal section through different embodiments of screen printing frames with a screen printing stencil, FIGS. 8 to 12 show views in cross-section through a portion of a screen printing frame, on a larger scale than FIGS. 5 to 7, FIGS. 13 and 14 show views in cross-section on a larger scale than FIGS. 5 to 12, and FIGS. 15 and 16 are diagrammatic views showing assembly aids.

Figure 1:
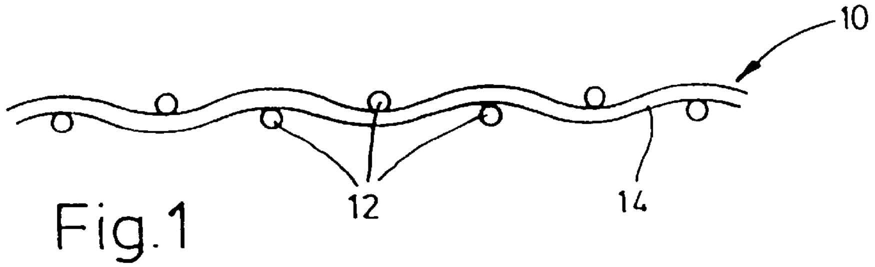
FIG. 1 is a view in cross-section through a cloth.

A cloth 10 for the production of screen printing stencils is produced from mutually crossing warp threads or yarns 12 and weft yarns or threads 14, as shown in FIG. 1 in a so-called linen or basket weave, in which two warp threads 12 and two weft threads 14 belong to a respective repeat—namely, a unit of repetition which is fixed by a given number of bonding locations as indicated at 16. The threads 12, 14 can comprise any plastic base materials, for example polyamide (PA), polyethylene (PE), polyethyleneterephthalate (PET), or the like.

The plastic cloth 10 is subjected continuously, as a roll, to a vapour deposition process, the maximum web length being determined by the largest possible winding diameter in the vapour deposition installation.

The vapour deposition material used is for example gold, silver, copper, nickel, steel, aluminium or the like precious, non-ferrous, heavy or light metals—each alone or in combination—more specifically, in such a way as to be matched to the subsequent galvanisation operation.

Figure 3:
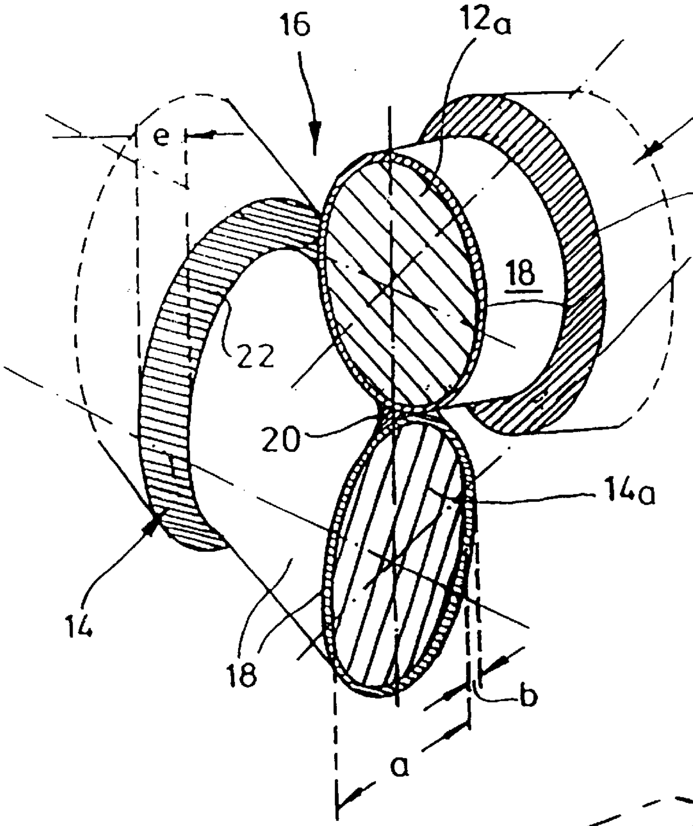
FIG. 3 shows a part of FIG. 2 on an enlarged scale, with a perspective view onto a bonding between two mutually crossing yarns.

The vapour deposition or sputtering operation—or possibly also vacuum plasma application—is effected on both sides and is possibly repeated a plurality of times, for special requirements. In that operation, a casing layer 18 of a layer thickness b of about 50 to over 200 nm, which is clearly shown in FIG. 3, is produced around the threads 12, 14 each as a respective plastic core—which is identified in FIGS. 2 and 3 by references $\mathbf{12}_a$ and $\mathbf{14}_a$ to distinguish them from the warp and weft threads 12 and 14 respectively for the sake of enhanced clarity of the drawing—of a diameter a of for example 15 μm to 100 μm; depending on the type of cloth and the kind of vapour deposition, the casing layers can involve surface resistance values of below 0.5 ohm/2 to over 100 ohm/2.

Figure 2:
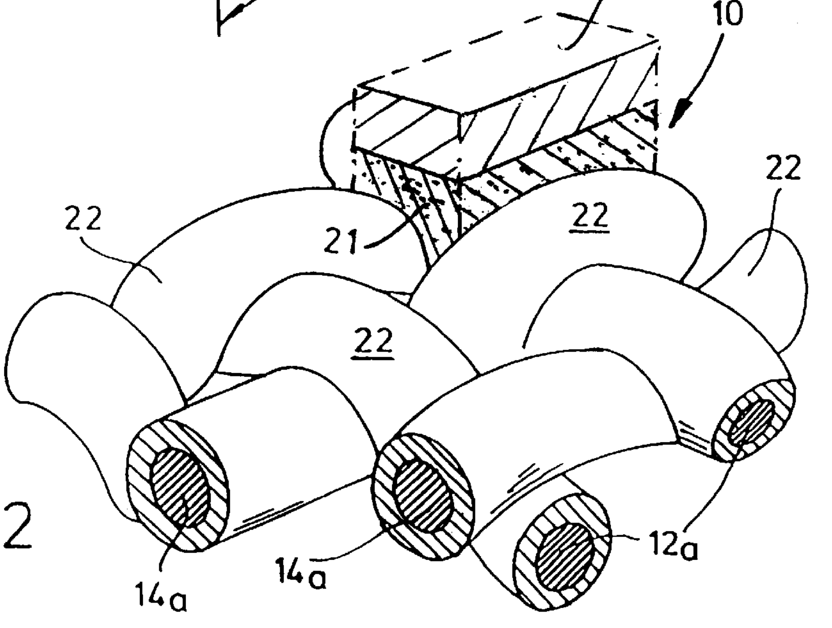
FIG. 2 is a perspective view of an enlarged part of the cloth.
Figure 8:
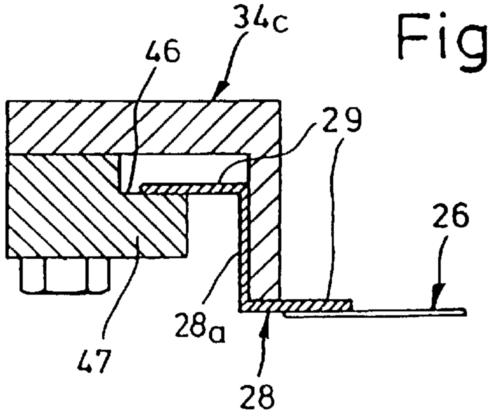
Figure 9:
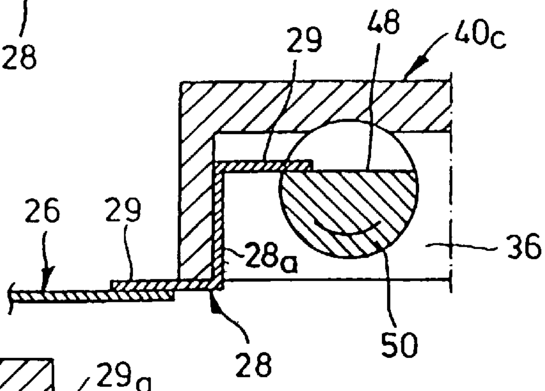

That dry coating operation can also result in accumulations of material in the region of each bonding 16, one such bonding being indicated at 20 in FIG. 2 between the mutually crossing threads 12, 14.

Direct galvanic metal deposition can now be effected on the plastic cloth which has been prepared by vapour deposition in the above-described manner. In the galvanic application procedure, once again any metals can be used such as for example Cu, Ni or the like.

The vapour deposition material and the vapour deposition thickness are to be matched to the subsequent galvanising process in order to prevent the casing layer 18 from being reduced by the galvanic bath, whereby the conductivity of the vapour deposition would be reduced or eliminated in the event of prolonged exposure times. Combinations for galvanic metallisation are inter alia as follows:

- a Cu-vapour deposition with a surface resistance of about 0.5 to 1 ohm/2 for subsequent galvanic nickel-plating, or
- steel vapour deposition with a surface resistance of about 0.4 ohm/2 to 10 kohm/2 for subsequent galvanic nickel-plating.

The galvanic metallisation operation can be implemented as a continuous procedure with practically any roll length and results in a closed metal coating 22 of selectable layer thickness e—of preferably 2 μm to 20 μm and more—over the entire cloth $\mathbf{10}_a$; that metal coating 22 provides both for a high level of mechanical stability, in particular slip resistance, and also for chemical resistance on the part of the metallised cloth $\mathbf{10}_a$; as stated, its strength is considerably increased, with a considerable reduction in stretchability.

FIG. 4 shows in a printing or clamping frame 24 a plate-like screen printing stencil or screen printing form 26 comprising metallised cloth $\mathbf{10}_a$ produced in the above-described manner, and connecting profile members or bars 28 which are fixed at two oppositely disposed sides. The drawing does not show that the cloth $\mathbf{10}_a$ is provided with a photosensitive layer of emulsion which includes a print pattern which is produced by photographic procedures and which is to be printed on a print material 30 disposed therebeneath. The print material 30 is supported on a print table at a deflection distance or spacing h beneath the tensioning plane (not shown in FIG. 4) of the screen printing stencil 26; during the printing operation a squeegee 32 which is guided over the cloth $\mathbf{10}_a$ in parallel relationship to the connecting bars 28 pushes the cloth $\mathbf{10}_a$ in a linear configuration onto the print material 30. The squeegee 32 which is also referred to as a scraper or doctor is in this case a rectangular member with a print edge 33, the length of the rectangular member approximately corresponding to that of the connecting bars 28, and over its path of movement it presses the printing ink through the mesh openings of the cloth $\mathbf{10}_a$, which are open in the print pattern.

The rectangular printing frame 24 comprises four frame profile members or frame sides 34 which are here in the form of hollow profile portions and of which one—identified as $\mathbf{34}_a$—affords an internal space 36 of undercut configuration for engagement of the one connecting bar 28 therein; the latter is of a substantially S-shaped configuration in cross-section with support limbs 29 at both sides of a main strip portion $\mathbf{28}_a$, projecting in opposite directions at the longitudinal edges thereof; one of the support limbs 29 is fixed in the internal space 28 while the other which is arranged on the cloth $\mathbf{10}_a$ bears snugly against a lower edge 38 of the hollow profile member.

The other connecting bar 28 which is of the same configuration but which is disposed in the opposite position in terms of cross-section is mounted in the above-described manner in the internal space 36, of an undercut configuration, of a tensioning bar 40 which is the same in terms of cross-section but in opposite relationship to the hollow profile member $\mathbf{30}_a$ and which is connected to the adjacent parallel hollow profile member 34 of the printing frame 24 by coil springs acting as force storage means 42, and therefore when pressure is applied to the cloth $\mathbf{10}_a$ it can be moved limitedly in the opposite direction to the tensioning direction x.

Figure 11:
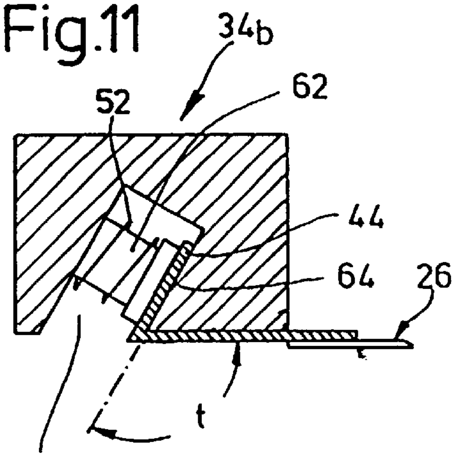
Figure 12:
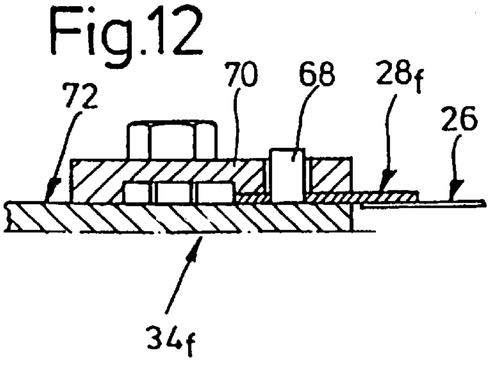

The screen printing stencil 26 of smaller format as shown in FIG. 5 is attached to the frame profile member $\mathbf{34}_b$ shown therein of the printing frame 24—and also in the tensioning bar $40_b$ of the same configuration—by a hook bar 44 which is inclined relative to the surface of the cloth. FIG. 11 shows further details in this respect.

FIG. 6 shows a screen printing stencil 26 with the parallel connecting bars 28 which were described with reference to FIG. 4 and which here are mounted on the frame profile member $34_c$ at an insert shoulder 46 of an additional bar 47 and on the tensioning bar $40_c$ on a segment shoulder 48 of a tensioning shaft 50. These mounting arrangements are shown in the views on an enlarged scale in FIGS. 8 and 9.

In FIG. 7 a tensioning spring 52 presses against a mounting profile member 54 which applies a load to a support nose 56 of the frame profile member $34_d$ or the tensioning bar $40_d$ respectively; in the bar-like mounting profile member 54 a strip bead 58 of the screen printing stencil 26 is disposed in a strip groove.

Figure 10:
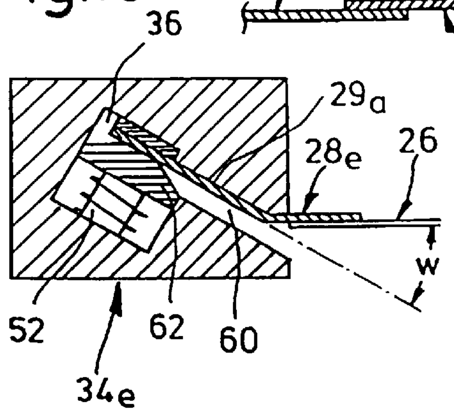

The frame profile member $34_c$ in FIG. 10 accommodates in an inclined slot 60 a limb $29_a$, which is inclined upwardly at an angle w of <40°, of a connecting bar $28_e$ which is of approximately angular configuration in cross-section. That limb $29_a$ is held by a spring-loaded clamping portion 62 of the frame profile member $34_e$.

FIG. 11 shows the mounting of the above-mentioned hook bar 44 which engages behind a groove wall 64 of an inclined groove 66 of the frame profile member $34_b$, the groove wall 64 being inclined at an angle t of about 120° relative to the surface of the screen printing stencil 26.

When a screen printing stencil 26 with a flat connecting bar $28_f$ is used, then as shown vertical register or tensioning pins 68 of the frame profile member $34_f$ engage through corresponding bores in the connecting bar $28_f$. The latter is held against the support surface 72 of the frame profile member $34_f$ by a pressure bar 70 which is screwed to the frame profile member $34_f$.

Figure 14:
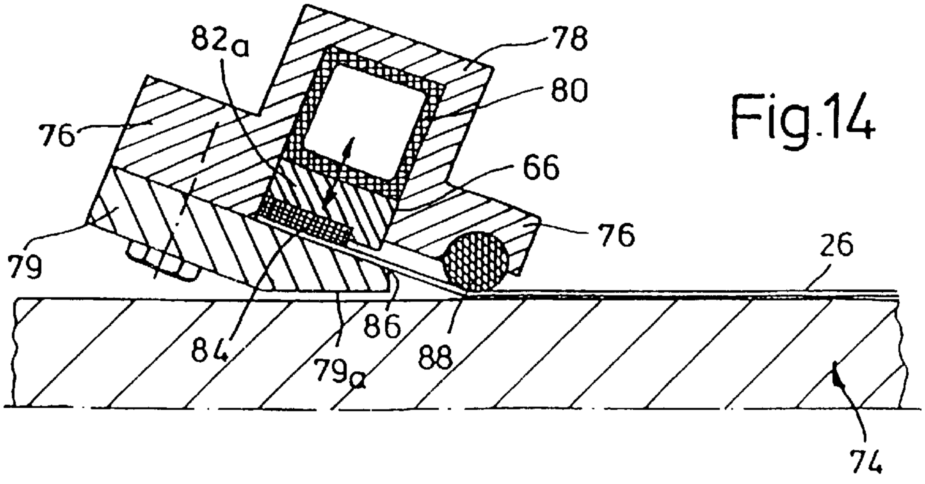
Figure 13:
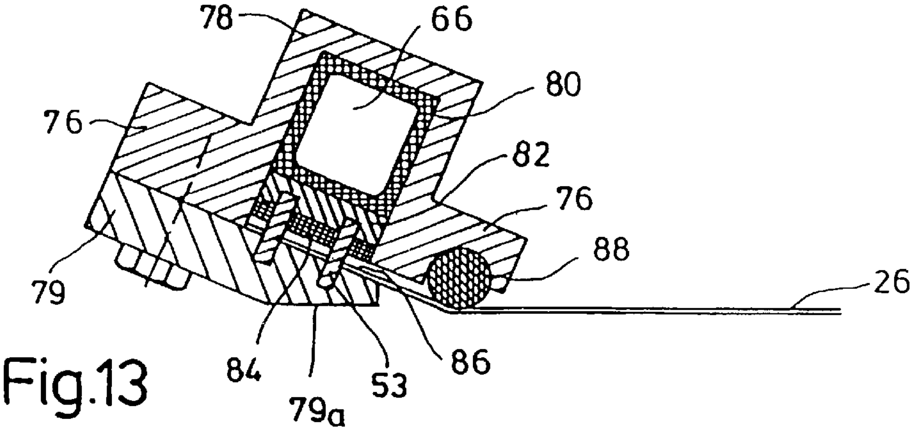
Figure 15:
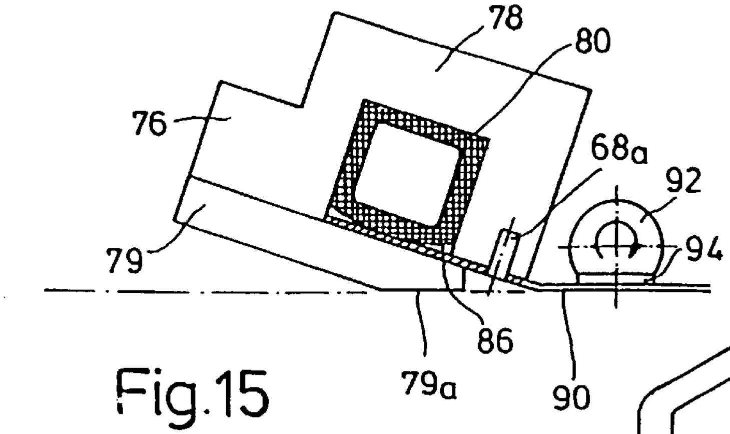

FIGS. 13 and 14 show a further possible fixing means for fixing a screen printing plate 26 on a printing table 74. Disposed in an inclined groove 66 of a hollow profile member 78 provided with two side bar portions 76 formed thereon is an air bellows 80 of approximately square cross-section, which presses with an outside surface against a plastic bar 82. The latter in turn bears against a rubber strip 84 associated with the edge of the screen printing plate 26; as shown in FIG. 15, passing therethrough are coil springs 53 which are seated at one end in the plastic bar 82 and at the other end in a web 79 which engages under the rubber strip 84. The web is screwed to the side bar portion 76 which is at the right in FIG. 13, and is provided, towards the table, with an inclined surface $79_a$ which is parallel to the printing table 74. The coil springs 53 open a clamping jaw arrangement 86 produced in that way when the pressure in the air bellows 80 has fallen to 0 bar.

In the clamping jaw arrangement 86—that is to say between the web 79 and the rubber strip 84—there extends an edge region of the screen printing plate 26 which is fed to the printing table 74 by means of an elastic bead portion 88 which partially projects out of the other side bar portion 76. That elastic edge 88 produces here a smoothing effect.

The embodiment shown in FIG. 14 does not have the coil springs 53; the plastic bar $82_a$ is possibly cambered in order to compensate for flexing of the frame or to relieve the load on the plate edges.

Figure 16:
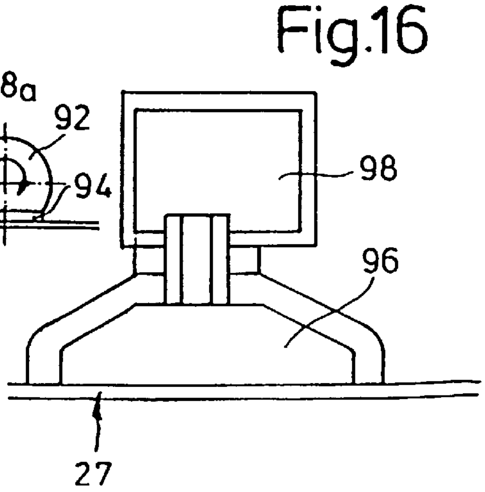

FIGS. 15 and 16 shows assembly aids; in FIG. 15 the clamping jaw arrangement 86 accommodates an angled and magnetic plate 90 with which there are associated register or fitting pins $68_a$ and—under a shaft 92—a magnetic strip 94. By virtue of that arrangement the edge region of the stencil 26 can be better handled.

FIG. 16 shows a suction cup 96 on a vacuum bar 98 which has an elastic foil 27 bearing at the edge against the screen printing plate 26, as a guide and lift means.

Protection is claimed separately for the assembly aids shown in FIGS. 15 and 16:

What is claimed is:

1. A screen printing form with screen printing cloth comprising mutually crossing plastic threads as a carrier for a coating comprising an emulsion for a printing apparatus wherein the plastic threads (12, 14) are coated with a casing layer (18) which is produced thereon by one of vapor deposition, flame-sprayed and sputtering of at least one metal material and wherein the casing layer is covered by a further metal coating (22) which carries the emulsion and which is produced galvanically.

2. A screen printing form according to claim 1, wherein the at least one metal material is applied to the screen printing cloth (10) on both sides thereof by one of spraying, vapor deposition and sputtering a plurality of times.

3. A screen printing form according to claim 1 wherein the casing layer (18) contains an element selected from the group consisting of gold, silver, nickel, copper, and mixtures thereof.

4. A screen printing form according to claim 1 wherein the casing layer (18). contains an element selected from the group consisting of gold, silver, nickel, copper, steel, aluminum and mixtures thereof.

5. A screen printing form according to claim 1 wherein the casing layer (18) has a thickness of greater than or equal to about 5 nanometers, and a surface resistance of greater than or equal to about 0.2 ohm/$_2$.

6. A screen printing form according to claim 1, wherein the galvanically produced metal coating (22) on the casing layer (18) is of a layer thickness (e) of at least about 2 $\mu$m.

7. A screen printing form according to claim 1, wherein the metal coating (26) contains nickel.

8. A screen printing form according to claim 1, wherein the emulsion forming a covering (21) on the metal coating (22) is covered by a protective foil ($21_a$).

9. A screen printing form according to claim 1, wherein screen printing plates (26) of a predetermined format size are cut out of the metallized plastic cloth (10a).

10. A screen printing form according to claim 1, wherein the screen printing plate (26) is provided at two oppositely disposed edges with connecting elements (28, $28_e$, $28_f$) for fixing to a printing frame (24) and the connecting element for an edge of the screen printing plate (26) is a profiled connecting bar (28, $28_e$, $28_f$).

11. A screen printing form according to claim 1, wherein the casing layer (18) has a thickness of greater than or equal to about 5 to 200 nanometers, and a surface resistance of greater than or equal to about 0.2 ohm/2 to 200 ohm/$_2$.

* * * * *